United States Patent
Priyanto et al.

(10) Patent No.: US 12,245,178 B2
(45) Date of Patent: Mar. 4, 2025

(54) COVERAGE ENHANCEMENT IN A WIRELESS NETWORK

(71) Applicant: Sony Group Corporation, Tokyo (JP)

(72) Inventors: Basuki Priyanto, Lund (SE); Nafiseh Seyed Mazloum, Lund (SE); Johan Hill, Lund (SE)

(73) Assignee: Sony Group Corporation, Tokyo (JP)

(*) Notice: Subject to any disclaimer, the term of this patent is extended or adjusted under 35 U.S.C. 154(b) by 465 days.

(21) Appl. No.: 17/639,464

(22) PCT Filed: Mar. 11, 2021

(86) PCT No.: PCT/EP2021/056209
§ 371 (c)(1),
(2) Date: Mar. 1, 2022

(87) PCT Pub. No.: WO2022/033727
PCT Pub. Date: Feb. 17, 2022

(65) Prior Publication Data
US 2022/0417880 A1  Dec. 29, 2022

(51) Int. Cl.
*H04W 56/00* (2009.01)
*H04L 1/08* (2006.01)
(Continued)

(52) U.S. Cl.
CPC ........... *H04W 56/0015* (2013.01); *H04L 1/08* (2013.01); *H04W 72/046* (2013.01); *H04W 74/0833* (2013.01)

(58) Field of Classification Search
CPC ..... H04W 24/08; H04W 24/10; H04W 72/21; H04W 74/002–008; H04W 72/04;
(Continued)

(56) References Cited

U.S. PATENT DOCUMENTS 10,390,262 B2 * 8/2019 Tsuboi .................. H04W 24/08
10,397,953 B2 * 8/2019 Kim ...................... H04W 56/00
(Continued)

FOREIGN PATENT DOCUMENTS

EP   3471497 A1   4/2019
EP   3567929 A1   11/2019
(Continued)

OTHER PUBLICATIONS

International Search Report from corresponding International Application No. PCT/EP2021/056209, mailed on Dec. 22, 2021, 3 pages.
(Continued)

*Primary Examiner* — Brendan Y Higa
(74) *Attorney, Agent, or Firm* — Tucker Ellis LLP

(57) ABSTRACT

Method for network access carried out in a User Equipment, UE, the method comprising: acquiring at least one of a plurality of synchronization signals transmitted from a base station, each synchronization signal identifying a synchronization resource usable for identifying an associated access channel resource of a sequence of access channel resources; synchronizing to the base station based on the at least one synchronization signal; obtaining, from the base station, information identifying a first access channel resource and a second access channel resource; transmitting an access preamble in the first access channel resource, and transmitting, based on meeting a repetition criteria, said access preamble in the second access channel resource for enhanced coverage operation.

25 Claims, 7 Drawing Sheets

(51) Int. Cl.
*H04W 72/044* (2023.01)
*H04W 74/0833* (2024.01)

(58) Field of Classification Search
CPC ......... H04W 72/0446; H04W 72/0453; H04W 74/0833–0838; H04B 17/309–328; H04L 1/08; H04L 1/189; H04L 27/26132
See application file for complete search history.

(56) References Cited

U.S. PATENT DOCUMENTS

| | | | |
|---|---|---|---|
| 10,805,957 B2* | 10/2020 | Yi | H04W 72/0446 |
| 10,849,167 B2* | 11/2020 | Svedman | H04W 74/008 |
| 10,893,540 B2* | 1/2021 | Akkarakaran | H04L 5/0094 |
| 11,653,389 B2* | 5/2023 | Lei | H04L 1/189 370/329 |
| 2015/0016312 A1 | 1/2015 | Li et al. | |
| 2015/0016321 A1 | 1/2015 | Miryala et al. | |
| 2015/0117233 A1* | 4/2015 | Wong | H04L 1/188 370/336 |
| 2016/0100431 A1* | 4/2016 | Kishiyama | H04W 74/08 370/252 |
| 2016/0149631 A1* | 5/2016 | Sanderovich | H04L 5/001 370/329 |
| 2016/0212769 A1* | 7/2016 | Huang | H04W 72/0446 |
| 2016/0316491 A1* | 10/2016 | Axmon | H04L 5/0058 |
| 2019/0044659 A1* | 2/2019 | Alnås | H04W 74/0858 |
| 2019/0090281 A1* | 3/2019 | Vos | H04W 72/04 |
| 2019/0268947 A1 | 8/2019 | Zhang et al. | |
| 2019/0320430 A1* | 10/2019 | Kim | H04L 5/0094 |
| 2020/0008188 A1 | 1/2020 | Nam et al. | |
| 2020/0162305 A1* | 5/2020 | Yoon | H04L 27/2646 |
| 2020/0260485 A1* | 8/2020 | Lei | H04L 5/0055 |
| 2020/0281017 A1* | 9/2020 | Ohara | H04W 74/08 |
| 2020/0314673 A1* | 10/2020 | Deogun | H04B 7/0632 |
| 2020/0359425 A1* | 11/2020 | Chen | H04W 76/11 |
| 2021/0058971 A1* | 2/2021 | MolavianJazi | H04L 5/0044 |
| 2021/0076384 A1* | 3/2021 | MolavianJazi | H04B 17/318 |
| 2021/0195654 A1* | 6/2021 | Lei | H04L 1/1819 |
| 2021/0266974 A1* | 8/2021 | Taherzadeh Boroujeni | H04W 24/10 |
| 2022/0061097 A1* | 2/2022 | Kwak | H04W 24/08 |
| 2022/0256612 A1* | 8/2022 | MolavianJazi | H04W 48/12 |
| 2022/0321166 A1* | 10/2022 | Kwak | H04B 1/7143 |

FOREIGN PATENT DOCUMENTS

| | | |
|---|---|---|
| WO | 2018175705 A1 | 9/2018 |
| WO | 2019014907 A1 | 1/2019 |
| WO | 2019097661 A1 | 5/2019 |
| WO | 2021013165 A1 | 1/2021 |

OTHER PUBLICATIONS

Office Action and Search Report from corresponding Swedish Application No. 2050569-9, mailed on Mar. 17, 2021, 11 pages.

* cited by examiner

COVERAGE ENHANCEMENT IN A WIRELESS NETWORK

TECHNICAL FIELD

The present disclosure relates generally to wireless communication. More specifically, the present disclosure relates to solutions for uplink coverage enhancement for wireless devices to initiate access with a wireless network comprising base stations configured to operate with sequential resources allocated with different timing.

BACKGROUND

Electronic devices often include wireless communications circuitry, and such electronic devices may be referred to as wireless terminals. For example, cellular telephones, computers, and other devices often contain antennas and wireless transceivers for supporting wireless communications. In 3GPP (The 3rd Generation Partnership Project) documentation, a wireless terminal, or wireless communication device, is commonly referred to as a User Equipment (UE). This term will be used herein but shall not be construed as being limited to operation under 3GPP specifications. A base station defines a cell and is operative to serve a surrounding area with radio access for UEs, by providing radio access to UEs within a cell. A base station may also be referred to as an access node, and various terms are used in 3GPP for different types of systems or specification. An access network, or Radio Access Network (RAN), typically includes a plurality of access nodes, and is connected to a Core Network (CN) which inter alia provides access to other communication networks.

Various recent sets of specifications for radio communication are referred to as the 5G type radio communication system (5GS), including the New Radio (NR) technology, wherein the term gNB is used to denote a base station. In NR, communication may be configured in lower frequency bands with 410 MHz-7125 MHz frequency range, denoted FR1, and well into the mm wave spectrum, with 24250 MHz-52600 MHz frequency range, denoted FR2. There could also be any other frequency range(s).

NR provides enhanced possibilities for wireless communication and opens up a market for may new types of devices. Specifically, UEs may take many forms from very high capacity devices to very basic types of UEs. To support new low complexity NR use cases, e.g., wearable or industrial wireless sensor type applications, studies on the possibility of introducing an NR UE feature and parameter list with lower end capabilities has been agreed to be part of 3GPP Release 17. These UEs in these new use-cases have reduced capability compared to e.g. Release 16 eMBB (enhanced Mobile Broadband) and URLLC (Ultra Reliable Low Latency Communications) UEs. With limited physical size and energy resources, one potential UE complexity reduction feature is reduced number of UE RX/TX antennas. In practice, this may be reducing the number of antenna panels and/or antenna elements. Another potential scenario is reduced UE Tx power, e.g. for so called wearables. Both these scenarios can result in reduced/limited coverage compared to eMBB type use cases. Another potential scenario is reduced operating bandwidth. Legacy NR UE can be operated up to 400 MHz. A reduced capability UE may have significantly smaller bandwidth, such as 5 MHz, 10, MHz, or 60 MHz depending on the frequency range and the selected numerology.

There is thus a need for solutions for ensuring or enhancing coverage for UEs which have reduced capabilities.

SUMMARY

In view of these challenges, the present disclosure serves to provide solutions related to network access carried out in a UE with respect to a base station. The proposed solutions is defined by the terms of the independent claims, whereas embodiments are set out in the dependent claims.

In the context of the UE, the proposed solution is provided by a method comprising:

acquiring at least one of a plurality of synchronization signals transmitted from a base station, each synchronization signal identifying a synchronization resource usable for identifying an associated access channel resource of a sequence of access channel resources;

synchronizing to the base station based on the at least one synchronization signal;

obtaining, from the base station, information identifying a first access channel resource and a second access channel resource;

transmitting an access preamble in the first access channel resource, and transmitting, based on meeting a repetition criteria, said access preamble in the second access channel resource for enhanced coverage operation.

This provides a solution for coverage enhancement or recovery, usable in conditions where the UE has unsatisfactory uplink coverage, such as at a cell edge associated with the base station.

DETAILED DESCRIPTION

Figure 1A:
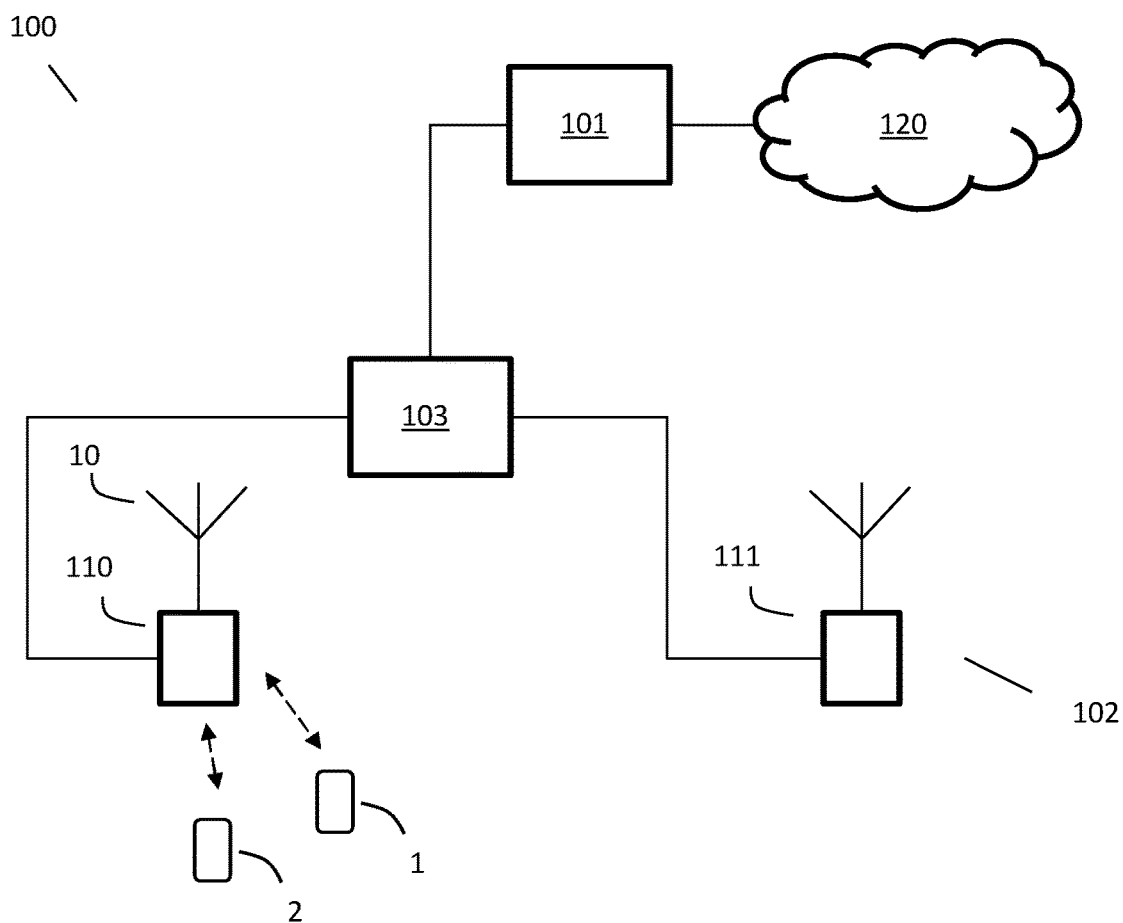
FIG. 1A schematically illustrates a wireless network and communication between a UE and a base station in a scenario according to various embodiments.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1A schematically illustrates a wireless communication system, providing an example of a scene in which the solutions provided herein may be incorporated. The wireless communication system includes a wireless network 100, and a UE (or terminal) 1 configured to wirelessly communicate with the wireless network 100. The wireless network may be a radio communication network operating under general and specific regulations and limits published by the 3GPP, such as a New Radio (NR) network. The wireless network 100 may include a core network 101, which is connected to other networks 120, such as the Internet. The wireless network 100 further includes an access network 102, such as a Radio Access Network (RAN), which comprises a plurality of base stations or access nodes 110, 111. A base station is an entity executing the wireless connection with UEs. As such, a base station 110 comprises or is connected to an antenna arrangement 10 for transmitting and receiving radio signals. The actual point of transmission and reception of the base station may be referred to as a Transmission and Reception Point (TRP). The TRP may be seen as a network node which includes or is co-located with an antenna system 10 of the base station 110. The base station(s) 110, 111 may be a gNB and be configured for beamforming as introduced for 5G. The drawing further illustrates a network node 103, which may incorporate a function for managing communication with and cooperation of the base stations 110, 111, such as a user plane function. In various embodiments, a logical communication interface may be provided between the base stations 110, 111.

The UE 1 may be any device operable to wirelessly communicate with the network 100 through the base station 110, 111, such as a mobile telephone, computer, tablet, a M2M device or other. The UE 1 can be configured to communicate in more than one beam, which are preferably orthogonal in terms of coding and/or frequency division and/or time division. Configuration of beams in the UE 1 may be realized by a spatial filter realized by using an antenna array configured to provide an anisotropic sensitivity profile to transmit radio signals in a particular transmit direction. Another example as an effort to further reduce UE complexity, UE 1 may be configured with a single beam by using an antenna array configured to provide an isotropic sensitivity to transmit radio signals.

Figure 1B:
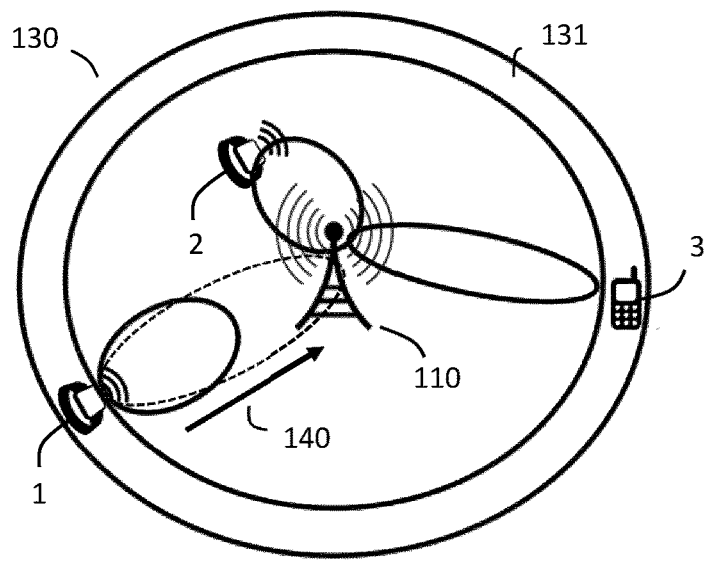
FIG. 1B schematically illustrates the need for coverage enhancement for a UE at a cell edge associated with a base station.

FIG. 1B schematically illustrates a coverage comparison between a legacy, Release 16, NR UE 3, and reduced capability UE 1, 2. In the drawing, the base station 110 is illustrated together with its associated cell 130. The UE 3 is located at a cell edge 131 of the cell 130, and still has uplink coverage. A less complex UE, such as a wearable or a sensor, or an industrial sensor, has reduced coverage compared to e.g. an eMBB UE 3, but as long as it is located sufficiently close to the base station 110, uplink coverage is provided, as exemplified for UE 2. However, at the cell edge 131, where the UE 1 is located, coverage is not sufficient to securely transmit a message in the uplink to the base station 110. Hence, coverage recovery or enhancement, as indicated by the arrow 140, may be needed to compensate for coverage reduction and to obtain coverage as indicated by the dashed lobe in the drawing.

Figure 2:
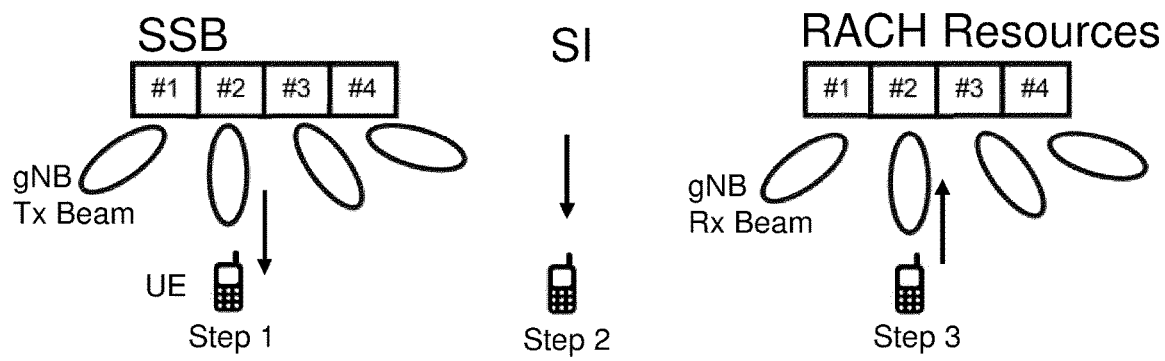
FIG. 2 schematically illustrates initial access of a UE to a base station in a NR scenario.

FIG. 2 schematically illustrates a part of initial access of a UE in NR. In a step 1, the UE performs synchronization and cell identification by acquiring synchronization signal block (SSB) transmitted by a gNB 110 (not shown in this drawing), which SSBs are sequentially transmitted. For example, SSBs are sequentially transmitted within 5 ms (known as SSB burst) and repeated every 20 ms. Each SSB may be associated with a certain spatial filter or beam. For lower bands of NR, such as FR1, transmission of two or more SSBs may spatially overlap. In higher frequency bands, such as in the mm wave spectrum, the lobe of transmission of each SSB becomes narrower. In FIG. 2, the UE has identified SSB index #2 is the best one by measuring received signal power (RSRP) of the SSBs. In step 2, after synchronization and camping on the gNB, using an associated SSB resource, the UE receives system information (SI) which contains Random Access CHannel (RACH) configuration, including the RACH resources, and its association to the SSBs. In step 3, the UE transmits an access channel preamble, also denoted RACH preamble, using the designated RACH resource index #2, which has an association with SSB index #2. This process of transmission of the RACH preamble is also known as a RACH occasion (RO), and represents an uplink transmission that needs to be sufficiently strong in order for the base station to detect the UE.

As discussed above, reduced UE capability can lead to reduced antenna gain and thereby coverage reduction compared to e.g. a legacy NR eMBB/URLLC UE. During the evaluation of legacy NR RACH operation, the assumption of UE antenna Tx gain is 5 dB. However, one may consider Tx antenna gain of a reduced capability UE in the order of 2 dB or lower. Herein, inter alia this issue is addressed in connection with the RACH procedure as described above with reference to FIG. 2, and solutions are proposed in which reduced capability UEs may perform their RACH transmission with certain repetition. This consequently requires extra allocation of RACH resources. Advantageous effects are provided in various embodiments by re-using existing resources, maintain association of SSB and RACH resources, and also limiting necessary extra information required to be added to the system information, e.g. by minimizing the number of parameters related to the extra RACH resources.

RACH preamble transmission with repetition has been introduced for LTE MTC/NB-IoT. In that case, though, a coverage enhancement of 20 dB is required which is substantially larger than what is required enhancement for NR redcap UE. In MTC, there is only one RACH occasion (RO) in a given time (RACH-preamble transmission opportunity). Repetition in MTC can be just be performed by allocating multiple RO resources, without any constraint. In NR, there are multiple ROs for a given time and each RO is assigned for each gNB Rx beam (that has an association with gNB Tx beam for SSB transmission). Introducing repetition in NR is problematic as the adjacent resources may have been occupied for RO of other beam(s). MTC operates in lower frequency and with single antenna and there is no need for beam operation. In NR, UEs with reduced capability may be operated in higher frequency and therefore beam operation is required to compensate for path-loss.

Before discussing various process solutions for the proposed method, the UE 1 and the base station 110 will be functionally discussed.

Figure 3:
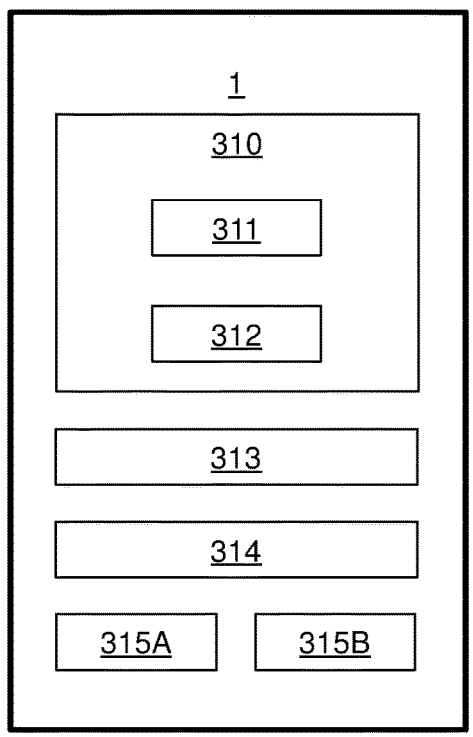
FIG. 3 schematically illustrates a UE configured to operate according to various embodiments.

FIG. 3 schematically illustrates an embodiment of the UE 1 for use in a wireless network 100 as presented herein, and for carrying out the method steps as outlined. The UE 1 may be an NR UE with reduced capability (redcap) as compared to e.g. an eMBB or URLLC NR UE. The reduced capability may in various embodiments be related to e.g. one or more of antenna gain, transmit power and operating bandwidth.

The UE 1 may comprise a radio transceiver 313 for communicating with other entities of the radio communication network 100, such as the base stations 110, 111, in different frequency bands. The transceiver 313 may thus include a radio receiver and transmitter for communicating through at least an air interface.

The UE 1 further comprises logic 310 configured to communicate data, via the radio transceiver, on a radio channel, to the wireless communication network 100 and possibly directly with another terminal by Device-to Device (D2D) communication.

The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the UE 1 to carry out any of the method steps as provided herein. Software defined by said computer program code may include an application or a program that provides a function and/or a process. The software may include device firmware, an operating system (OS), or a variety of applications that may execute in the logic 310.

The UE 1 may further comprise an antenna 314, which may include an antenna array. In various embodiments UE 1 is configured to operate with a single beam, wherein the antenna 314 is configured to provide an isotropic sensitivity to transmit radio signals.

The logic 310 may further be configured to control the radio transceiver to employ an anisotropic sensitivity profile of the antenna array to transmit radio signals in a particular transmit direction. In various embodiments, this may involve applying a transmit spatial filter 315A for adapting inter alia the spatial sensitivity of the antenna 314 in UL transmission, and a receive spatial filter 315B for adapting inter alia the spatial sensitivity of the antenna 314 in DL reception. Dependent on implementation, the spatial filters 315A, 315B may comprise plural groups of phase shifters, which may be independent.

Obviously, the terminal may include other features and elements than those shown in the drawing or described herein, such as a power supply, a casing, a user interface, one or more sensors, etc., but are left out for the sake of simplicity.

Figure 4:
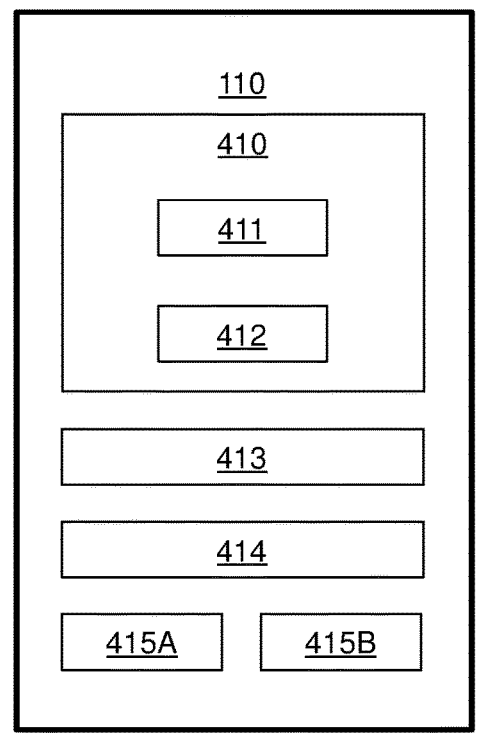
FIG. 4 schematically illustrates a base station configured to operate according to various embodiments.

FIG. 4 schematically illustrates a base station 110 for use in a radio communication network 100 as presented herein, and for carrying out the method steps as outlined herein.

The base station 110 includes or operates as a base station of a radio communication network 100, such as a gNB. The base station 110 may comprise a radio transceiver 413 for wireless communicating with other entities of the radio communication network 100, such as the UE 1. The transceiver 413 may thus include a radio receiver and transmitter for communicating through at least an air interface.

The base station 110 further comprises logic 410 configured to communicate data, via the radio transceiver, on a radio channel, with UE 1. The logic 410 may include a processing device 411, including one or multiple processors, microprocessors, data processors, co-processors, and/or some other type of component that interprets and/or executes instructions and/or data. Processing device 411 may be implemented as hardware (e.g., a microprocessor, etc.) or a combination of hardware and software (e.g., a system-on-chip (SoC), an application-specific integrated circuit (ASIC), etc.). The processing device 411 may be configured to perform one or multiple operations based on an operating system and/or various applications or programs.

The logic 410 may further include memory storage 412, which may include one or multiple memories and/or one or multiple other types of storage mediums. For example, memory storage 412 may include a random access memory (RAM), a dynamic random access memory (DRAM), a cache, a read only memory (ROM), a programmable read only memory (PROM), flash memory, and/or some other type of memory. Memory storage 412 may include a hard disk (e.g., a magnetic disk, an optical disk, a magneto-optic disk, a solid state disk, etc.).

The memory storage 412 is configured for holding computer program code, which may be executed by the processing device 411, wherein the logic 410 is configured to control the base station 110 to carry out any of the method steps as provided herein. Software defined by said computer program code may include an application or a program that provides a function and/or a process. The software may include device firmware, an operating system (OS), or a variety of applications that may execute in the logic 410.

The base station 110 may further comprise or be connected to an antenna 414, connected to the radio transceiver 413, which antenna may include an antenna array. The logic 410 may further be configured to control the radio transceiver to employ an anisotropic sensitivity profile of the antenna array to transmit and/or receive radio signals in a particular transmit direction. In various embodiments, this may involve applying a transmit spatial filter 415A for adapting inter alia the spatial sensitivity of the antenna 414 in DL transmission, and a receive spatial filter 415B for adapting inter alia the spatial sensitivity of the antenna 414 in UL reception. The base station 110, or alternatively only the antenna 414, may form a transmission point TRP for the base station 110.

The base station 110 may include other features and elements than those shown in the drawing or described herein, such as a power supply, a casing, a core network interface, etc., but are left out for the sake of simplicity.

Various embodiments will now be described with reference to the drawings. According to at least some of the proposed solutions, a reduced capability UE 1 can transmits RACH preamble with repetitions in multiple RACH occasions, RO, corresponding to different spatial filters, or beams, and/or also transmit preamble repetitions in an additional RACH resource, with a shift in time or/and frequency in relation to a main RACH resource. The solutions may be set out in a NR wireless network 100, where the operation is configured by the gNB 110.

Figure 5:
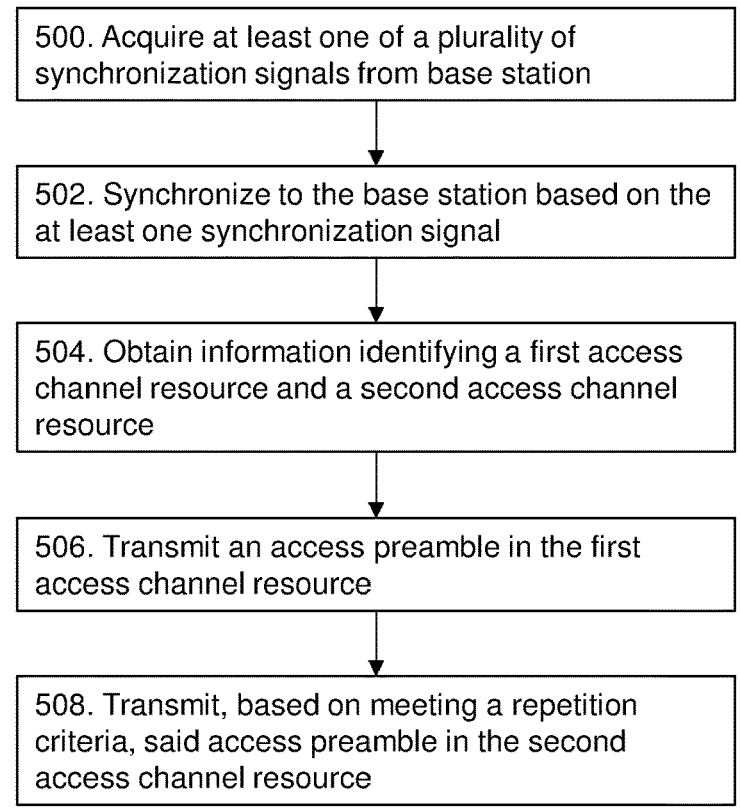
FIG. 5 schematically illustrates a flow chart of a method carried out in a UE according to various embodiments.

FIG. 5 schematically illustrates a flow chart of a general method for network access carried out in a UE 1. The method comprises:

Acquiring 500 at least one of a plurality of synchronization signals transmitted from a base station 110. Each synchronization signal identifies a synchronization resource usable for identifying an associated access channel resource of a sequence of access channel resources. The access channel resources are usable by UEs in the uplink for initial access to a wireless network 100 comprising the base station 110.

Synchronizing 502 to the base station 110 based on the at least one synchronization signal.

Obtaining 504, from the base station 110, information identifying a first access channel resource and a second access channel resource.

Transmitting 506 an access preamble in the first access channel resource.

Transmitting 508, based on meeting a repetition criteria, said access preamble in the second access channel resource for enhanced coverage operation.

In one aspect, the proposed method is executed by a UE 1, comprising the logic 310 configured to carry out the steps as outlined with reference to FIG. 5, and the further process steps presented herein.

Figure 6:
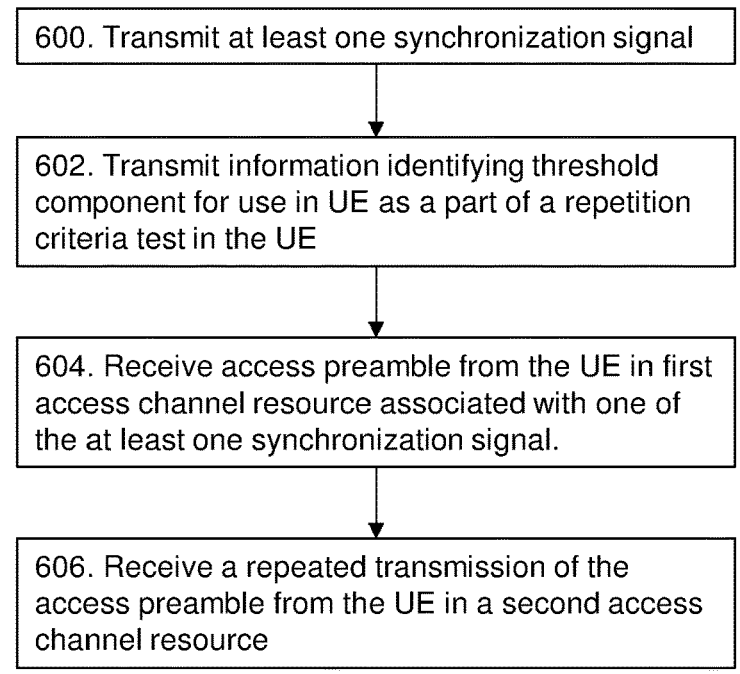
FIG. 6 schematically illustrates a flow chart of a method carried out in a base station according to various embodiments.

FIG. 6 schematically illustrates a flow chart of a general method for coverage enhancement of a UE 1, carried out in a base station 110 of a wireless network 100. The method comprises:

Transmitting 600 at least one synchronization signal.

Transmitting 602 information identifying a threshold component for use in the UE as a part of a repetition criteria test in the UE to determine access preamble repetition in uplink.

Receiving 604 an access preamble from the UE in a first access channel resource associated with one of the at least one synchronization signal.

Receiving 606 a repeated transmission of the access preamble from the UE in a second access channel resource.

In one aspect, the proposed method is executed by a base station 110, comprising the logic 410 configured to carry out the steps as outlined with reference to FIG. 6, and the further process steps presented herein.

By means of the proposed general solution and its various aspects, repeated transmission of the access preamble is obtained, responsive to the repetition criteria being met. The combined energy received in the base station of the repeated transmissions increases the possibilities of obtaining the preamble in the base station 110, so as to finalize the initial access of the UE 1.

Various embodiments will be described below related to at least two different concepts for configuring resources for repetitions. These may be implemented independently or in combination, unless where clearly contradictory. While the general solution as described and claimed shall be understood and read within the provided terms of language, the following description of embodiments will primarily be presented in the context of the wireless network 100 operating as an improved 5G NR network, wherein the base station 110 is a gNB. The gNB 110 is configured to operate by transmitting synchronization signals in the form of synchronization signal blocks (SSB), which in turn may comprise PSS (Primary Synchronization Signal), SSS (Secondary Synchronization Signal) and PBCH (Physical Broadcast Channel). The access preamble transmitted in uplink by the UE 1 is a RACH, or PRACH, preamble in such embodiments. RACH preamble in NR is a channel generated based on Zadoff Chu sequence. In total, there can be 64 preamble signatures are available in a cell. During initial access, a UE select randomly one out of 64 possible signatures.

According to various embodiments, additional resources are added to be used to support RACH repetitions. An advantage of this approach is that the legacy RACH resource for legacy 5G operation is not changed. Moreover, the additional RACH resources maintain the same configuration, e.g. RACH configuration with the same SSB to RACH resource mapping, as the existing legacy RACH resource, i.e. the first access channel resource. Mapping is the association of SSB resource and RACH resource where the gNB maintains the same beam relations.

In some embodiments, the UE 1 is dynamically configured via signaling, received from the wireless network 100, such as the base station 110. In some embodiments, the signaling identifies allocation of the second, additional access channel resource, such as by means of specified allocation data or a relation to other allocation data, such as to the first access channel resource. In some embodiments, the configuration is dynamic, such that the allocation or relation is not predetermined and the same all the time. The configuration may be determined by the base station 110, e.g. based on overall UE traffic in the associated cell.

In various embodiments, the base station 110 is configured to determine the allocation of the additional, second, access channel resource, such as an additional RACH resources.

Allocation of the second access channel resource may be identified by location in time and/or frequency. In some embodiments, the base station 110 may selectively apply one allocation of the additional, second, access channel resource, selected from a plurality of specified usable allocations. The allocation is provided to the UE 1 in said information, e.g. transmitted as system information.

In various embodiments, the allocation of the second access channel resource is configured relative to the first access channel resource. In some examples of such an embodiment, the additional RACH resource for the same RO index is identified by at least one of two new parameters:

T_shift
F_shift

T_shift is a time shift parameter, which identifies a timing of the second access channel resource relative to the first access channel resource. The T_shift parameter of the second RACH resource usable for repetition, i.e. the second access channel resource, may be configured by the gNB 110 to accommodate for required frequency retuning in the UE 1. In some embodiments, T_shift may relate to a whole sequence of ROs. Alternatively, T_shift may relate to one RO in a sequence of ROs, such as a first RO.

F_shift is a frequency shift parameter, which identifies a frequency location of the second access channel resource relative to the first access channel resource.

With reference to FIG. 2, the gNB 110 informs the UE 1 in a cell on the configuration of additional RACH resource(s) through system information, as indicated in step 2. The system information may explicitly indicate the parameters T_shift and/or F_shift by data representing the magnitude of the respective parameter. Alternatively, the system information may set a flag or code, which may be assessed and understood in the UE as representing a certain value for the parameter(s), e.g. based on a look-up table.

A number of different configurations for transmission of the additional RACH transmission 508 and its connection to T_shift and F_shift parameters are described with reference to FIGS. 7-10. Herein, the first access channel resource, such as a first RACH resource, is indicative of one access channel occasion, RO, of a first sequence of access occasions, ROs. The second access channel resource, such as a second RACH resource, is indicative of the corresponding one access occasion of a second sequence of access occasions, which corresponds to the first sequence.

In MTC, F_shift is applicable to one RACH occasion (RO). In contrast, it is here proposed that when F_shift is used, it is applicable to whole sequence of ROs in NR (and thus the associated sequence of access channel resources), as illustrated and described below.

Various proposed configurations provide allocation wherein the UE 1 performs transmission with repetitions and frequency shift operation using a separate sub-channel for repetition. Various alternatives of such solutions are described with reference to FIGS. 7-9.

Figure 7:
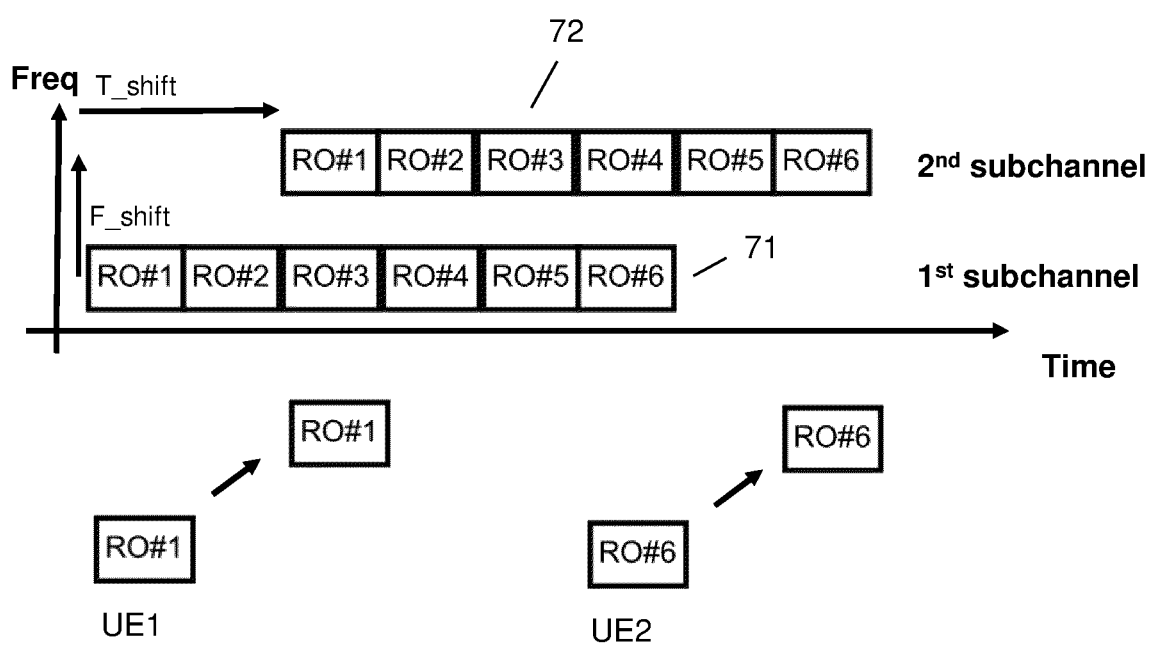
FIGS. 7-11 schematically illustrate various embodiments for providing resources for repetition at a plurality of uplink occasions.

FIG. 7 schematically illustrates a time frequency diagram of one embodiment of allocation of resources usable by a UE for repeated access preamble transmission to obtain coverage enhancement. Here, two sets, or sequences, of RACH resources are shown. In the example, each set or sequence comprises resources for 6 ROs, from RO index #1 to #6. The lower, first, sequence 71 represents legacy allocation of ROs, as used at normal coverage, i.e. without repetition. The upper, second, sequence 72 represents a new set of proposed ROs, usable for repetition of ROs in the first sequence 71. In this embodiment, a time shift T_shift and a frequency shift F_shift separate the second sequence 72 from the first sequence 71. It should be noted that the example of the frequency location of the second sequence 72 being at a higher frequency than the first sequence 71 is merely an example, and that the opposite may alternatively apply. For illustration purposes, each RO in the legacy first resource sequence has one-to-one mapping with SSB, thus corresponding to 6 possible spatial filters or Rx beam directions of the gNB 110. Each RACH resource is duplicated and placed with the same, mutual, T_shift and F_shift.

The allocation of the ROs of the new second subchannel is provided by the system information, indicating F_shift and T_shift, as described. Based on the need to enhance coverage, the UE 1, such as a reduced capability UE, may transmit the RACH preamble in two RO resources and maintain the same beam operation as it transmits in two resources with the same RO index. Since the two occasions of RACH preamble transmission using RO #1 are executed at different frequencies, the UE 1 is in various embodiments adapted to shift frequency of the transceiver 313. As a redcap UE, the UE 1 is expected to have a limited operating bandwidth. Hence, after RACH transmission in the first subchannel, UE1 needs to change its center frequency for the transmission in the second subchannel. In the example of FIG. 7, UE 1 uses RO #1 and UE2 uses RO #6.

Figure 8:
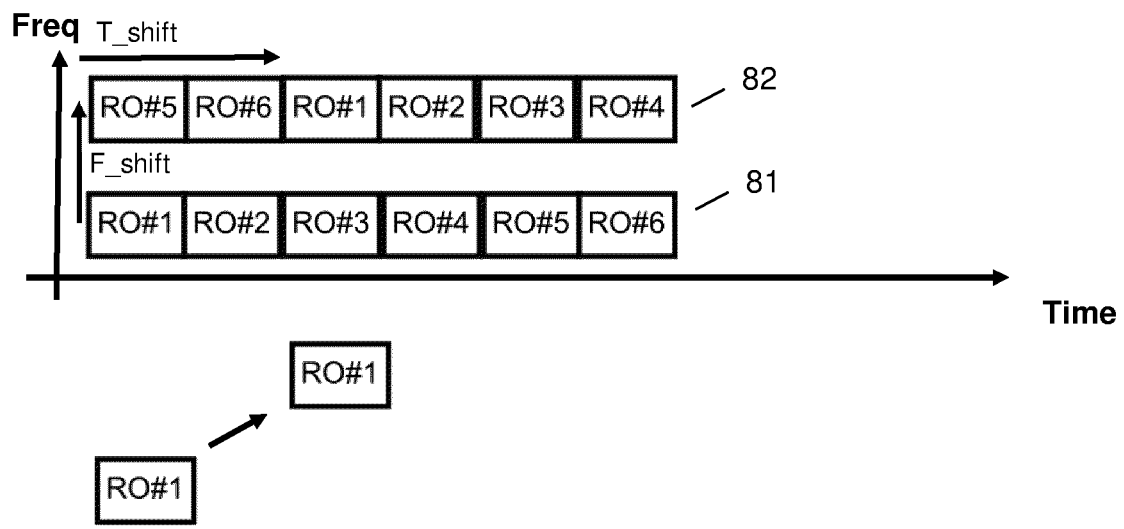
Figure 9:
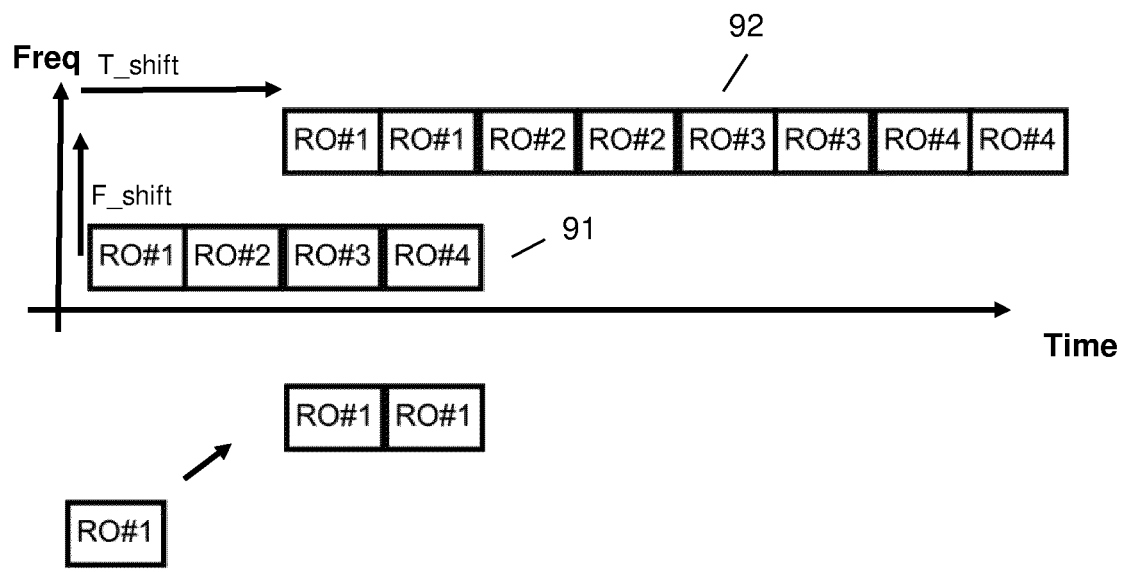
Figure 10:
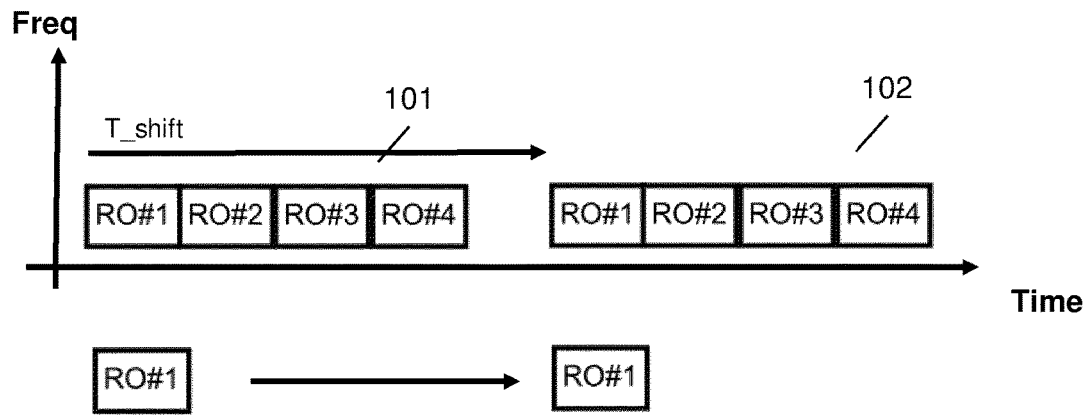

FIGS. 8-10 illustrates alternative configurations in respective time frequency diagrams. In those diagrams, certain indications provided in FIG. 8 with regard to subchannels and FH have been left out for the sake of simplicity but apply in a corresponding way.

FIG. 8 provides an alternative embodiment, without time shift applied to the whole sequences of ROs 81, 82. The benefit is the two sequences 81 and 82 of RACH resources are perfectly aligned. Instead, a cyclic shift of ROs is applied to the sequence 82 new, second, RACH resources with respect to the legacy, first, sequence 81. The second sequence 82 of access occasions is allocated as a circular permutation of the first sequence 81 of access occasions. In this embodiment, the time shift may selectively set T_shift as an indication of permutation by x number or ROs in the system information. In the illustrated embodiment, a UE allocated to RO #5 or RO #6 will be configured to repeat transmission in a subsequent frame of uplink resources.

FIG. 9 illustrates a variant of the embodiment of FIG. 7. Herein, allocation is made by the gNB 110 for more than two transmissions of the RACH preamble. Specifically, the illustrated example provides a first sequence 91 of ROs according to legacy NR, and a second subchannel on which a second sequence 92 of the corresponding ROs are provided, where each RO is provided twice. In this example, three ROs of the same index are available in a frame. Alternative arrangements may comprise more than two consecutive allocations of ROs in the second sequence 92.

To accommodate for this embodiment, the system information shared by the gNB may identify number of repetitions, which may be transmitted in combination with T_shift and F_shift. The number of repetitions may either identify the total number of ROs of each index, i.e. 3 in the example of FIG. 9. Alternatively, the number of consecutive resources for the same RO usable for the UE on the second subchannel, as identified by T_shift, F_shift, may be provided, i.e. 2 in the example of FIG. 9. In such embodiments, system information identifies n≥1 access occasions in succession on the second subchannel 92, corresponding to one access occasion identified by the first resource on the first subchannel 91.

FIG. 10 schematically illustrates an embodiment with time domain multiplexing (TDM) of legacy NR RACH resources and new RACH resources for repetition. In this drawing only 4 ROs are indicated, for the sake of simplicity. Here, a first access channel resource RO1 is one of a first sequence 101 of access occasions allocated in a first subchannel, such as according to legacy NR. The second access channel resource is the corresponding RO1 of a second sequence 102 of access occasions allocated in the same first subchannel, in time succession to the first sequence 101 of access occasions. This configuration avoids using extra resources in frequency domain, which may be advantageous e.g. if the gNB 110 has limited frequency resources, but at the expense of extra latency.

The UE 1 is preconfigured to be aware of all the potential configurations usable by the gNB to accommodate for access preamble repetition, e.g. as provided in the specific examples outlined with reference to FIGS. 7-10, and the gNB 110 has a flexibility in configuring/selecting the configuration. The UE 1 is informed of which configuration the gNB supports by means of the information provided by the 110 gNB via system information. As described, this information may identify one or more of T_shift, F_shift, and the number of repetitions.

The embodiments described with reference to FIGS. 7-10 describes scenarios where synchronization signals of only one SSB is considered. The situation may e.g. be that only one SSB is detected and received with a power level exceeding a certain threshold.

Figure 11:
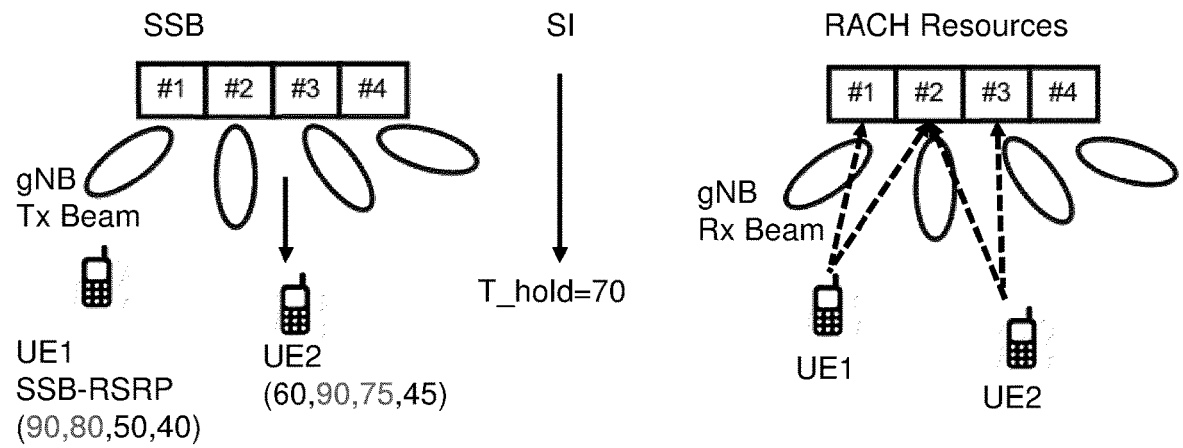

FIG. 11 schematically illustrates an embodiment or scenario in which operation with repetitions of an access preamble, e.g. RACH preamble, can be performed without additional resources being configured by the gNB 110. This relates to scenarios where more than one SSB is received with power over a certain threshold M. With reference to 5G NR, the received power may be referred to as RSRP (Reference Signal Received Power).

As illustrated in FIG. 11, the gNB is configured to transmit a sequence of at least 4 synchronization signals, such as 4 different SSBs with indices #1 to #4. Each SSB is transmitted with a different spatial filter, commonly referred to as a Tx beam, and has an associated SSB resource. The UE 1 may detect more than one of those SSBs, and measure a certain value of detection, such as a measure of received power. In the drawing, this is indicated below each of UEs 1 and 2. A threshold T_hold M for consideration of SSBs is be provided by the gNB 110 as system information. In certain scenarios, more than one of the detected SSBs may be received RSRP above T_hold M. In the example provided in FIG. 11, UE 1 receives SSB #1 and #2 above T_hold M, whereas UE 2 receives SSB #2 and #3 above T_hold M.

Considering the UE 1, it may now synchronize with and camp on the gNB 110 using e.g. a first SSB resource identified by SSB #1, but also identify a second SSB resource identified by SSB #2. Based thereon, the UE 1 is configured to obtain information from the base station 110 identifying both a first access channel resource and a second access channel resource. Specifically, the first access channel resource, (RACH resource) is indicative of a first RO #1 associated with the associated first SSB resource, and the second RACH resource is indicative of a second RO #2 associated with a second SSB resource.

The UE may thus be configured to transmit its access preamble (e.g. RACH preamble) in the first access channel resource related to RO #1, and, based on meeting a repetition criteria, transmit the same access preamble in the second access channel resource related to RO #2 for enhanced coverage operation. In such an embodiment, the gNB 110 is configured to perform preamble reception on one or more possible activated configurations. Such a configuration may be a pre-configuration in the gNB to perform preamble reception associated with a RO #k in all ROs within a certain range from that RO, based on a related spatial filters where a beam overlap is expected, such as RO #(k-m) to RO #(k+m), where m may be ≥1. The embodiments described with reference to FIG. 11 thus provide a method in which the first access channel resource and the second access channel resource identify different RO indices.

In one embodiment of operation of the UE 1 in accordance with the solutions provided with reference to FIG. 11, the transmission with repetition is carried out with the same link budget calculation. Hence, the transmission in two different ROs may be carried out with different transmit power (P1, P2) depending on path-loss computation by the UE 1. Hence, transmit power in the first access channel resource and transmit power in the second access channel resource are respectively configured to obtain a common link budget.

As noted, access preamble repetition of transmission, such as the RACH preamble, in both the first and the second access channel resource, is based on meeting a repetition criteria. The system of wireless network 100 may e.g. provide that RACH preamble transmission with repetitions can only be allowed when the UE 1 is in bad coverage, e.g. at the cell edge 131.

According to various embodiments, bad coverage or not is determined by a comparison with a threshold N. The repetition criteria thus comprises determining that received signal power of the at least one synchronization signal meets a threshold level criteria. Specifically, and in contrast to e.g. LTE MTC, the threshold is not only based on an RSRP level indicating a minimum received signal strength value, but includes in various embodiments determining a threshold level N for the threshold level criteria based on at least one transmit parameter of the UE 1. The threshold level N thus comprises a system threshold component X, such as an RSRP level obtained based on the information received from said base station, which may be received in system information from the gNB 110. The system threshold component X is further adjusted based on said transmit parameter. In some embodiments, the threshold level N may be determined by means of a predetermined function or algorithm, executed by the logic 310 of the UE, to adjust the system threshold component X, such as by multiplication with a factor or by addition of another component, wherein the value of said factor or component is determined based on said one or more transmit parameters. In some embodiments, the transmit parameter is based on antenna gain of the UE 1. In some embodiments, the transmit parameter is based on transmit power of the UE 1.

In various embodiments, determining a threshold level N for the threshold level criteria may involve the UE setting a threshold level is based on RSRP value (X) and also the red-cap UE capability parameters related to reduced antenna gain (Y) and/or reduced max Tx power (Z) relative to legacy UE, e.g. T_hold(N)=X+Y+Z. In various embodiments, T_hold(N)>T_hold(M).

As an example for illustration purposes, the system component X is obtained as a RSRP-related threshold value, received as system information in SIB. The system component may e.g. be −140 dBm.

The UE further applies one or more components based on transmit parameters.

One such component Y is based on UE Antenna Tx gain loss in dB, relative to a predetermined nominal value. Alternatively, the component is based on relative to UE Antenna Rx gain, relative to a predetermined nominal value. The nominal value may be a specified value, which may represent a standard NR UE antenna. In one embodiment, the component Y may assume one of the values [0, 3, 4, 6, 8]. Another component Z is based on reduced Tx power in dB relative to a nominal value, such as a specified value which may represent a standard NR UE value of 23 dBm. In one embodiment, the component Z may assume one of the values [0, 3, 6, 9]. Values 3 means the actual Tx power is 23−3=20 dBm.

The threshold level N is then T_hold(N)=X+Y+Z. For example, in case system component X is −140 dBm, antenna gain loss component Y is 3 dB, and reduced Tx power component Z is 6 dB, then T_hold(N) would be:

T_hold=−140 dBm+3+6=−131 dBm.

As an alternative or combined criteria for the UE 1 to determine whether to transmit a repetition of the access preamble in the second access channel resource, the repetition criteria comprises in some embodiments determining, in the UE 1, failed reception in the base station 110 of a preceding transmission of the access preamble in the first access channel resource. In other words, concluding that the previously sent access preamble was not properly received in the base station. The UE 1 typically know this failed reception in the base station by detecting that the UE 1 does not receive the response from the base station associated with the previously sent preamble. The response from basestation is known as random access response (RAR) message or Msg 2. In such an embodiment, the UE 1 is configured to first transmit on the first access channel resource, i.e. on one frequency and one time occasion. If no random access response (RAR) message is given from base station 110, it may be concluded in the UE 1 that reception in the base station 110 of that preceding transmission of the access preamble failed. The UE 1 is in this embodiment adapted to increase the use of resources in next iterative step, such as in the next frame or beam sweep or RACH period, by re-transmitting the access preamble in the first access channel resource and in the second access channel resource.

Figure 12:
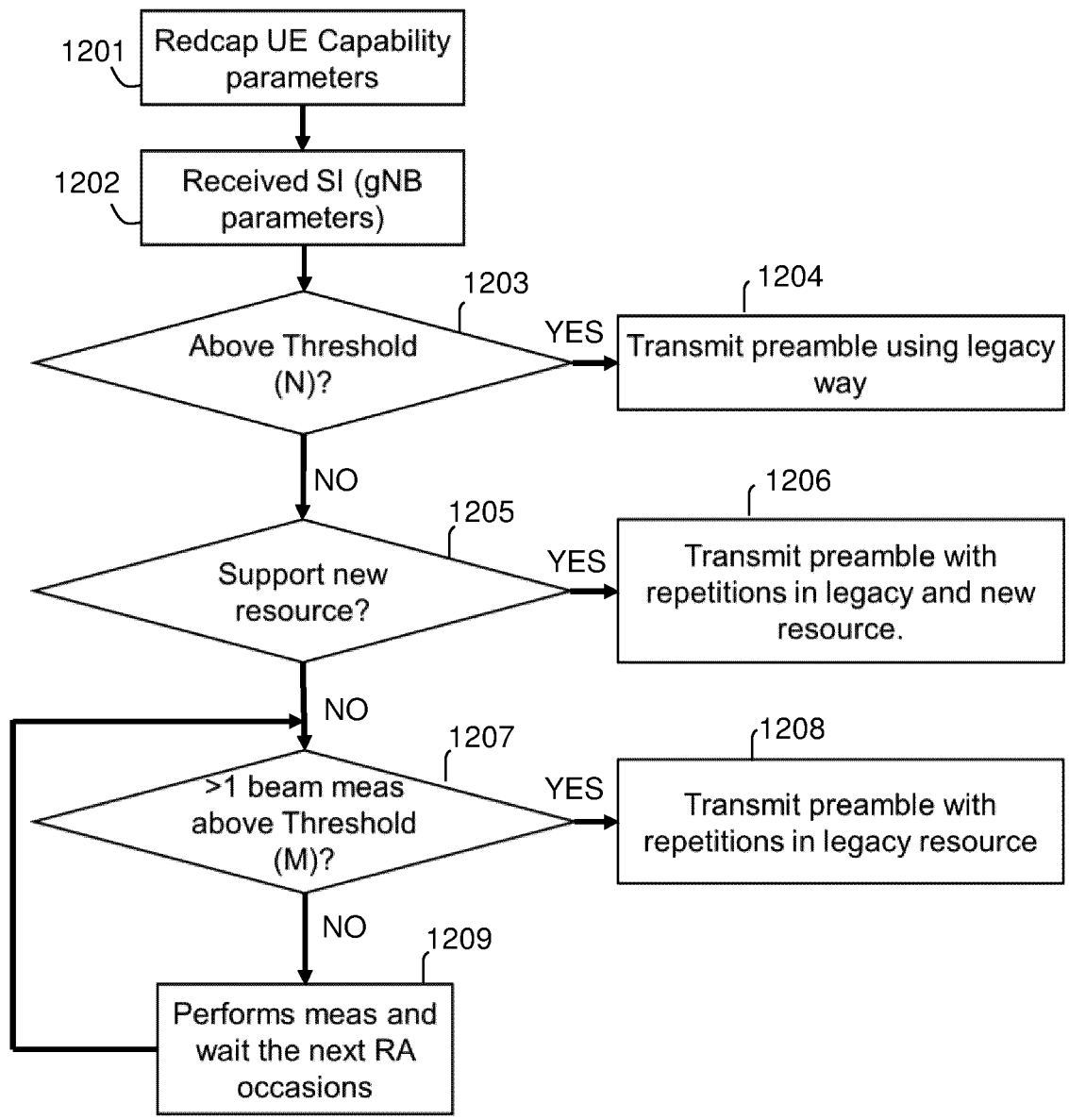
FIG. 12 schematically illustrates a flowchart of evaluation of various types of uplink transmission at initial access carried out in a UE according to various embodiments.

FIG. 12 schematically illustrates a flowchart of a method for a UE 1, such as a reduced capability UE, to determine and execute repeated transmission of an access preamble according to a process combining the features described with reference to FIGS. 7-10 and the features described with reference to FIG. 11. As described, the general method includes transmitting an access preamble, e.g. a RACH preamble, in the first access channel resource, and transmitting, based on meeting a repetition criteria, the same access preamble in the second access channel resource for enhanced coverage operation. According to various embodiments, when the repetition criteria is met, the UE 1 is primarily adapted to identify and use a first access channel resource and a second access channel resource having the same access occasion index, if so provided for in system information. The system information may further provide that the second access occasion is allocated in a second subchannel. If no such information identifying the second access channel resource is provided in system information, the UE 1 is adapted to instead identify the second access channel resource based on a second received synchronization signal, such as a second SSB in addition to a first SSB, identifying a transmit resource, such as an SSB resource, of the base station 110 to find the associated second access channel resource.

In some embodiments the UE is thus adapted to, responsive to information being obtained by receiving system information identifying a first subchannel for the first access channel resource and a second subchannel for repetition, transmit the preamble in the first subchannel and repeat transmission of the access preamble in the second subchannel; and otherwise, responsive to said information being obtained by receiving a first synchronization signal block, SSB, identifying a first SSB resource and a second SSB identifying a second SSB, transmitting the preamble in a the first access channel resource associated with the first SSB resource, and repeating transmission of the access preamble in the second access channel resource associated with the second SSB resource.

In FIG. 12 an example of this process is illustrated.

As provided by step 1201, the UE has certain transmit parameters. These transmit parameters may be predetermined be configuration, which may be reflected in UE capabilities, or be dependent on use. As exemplified herein, the transmit parameters may e.g. be associated with antenna gain and/or transmit power and/or operating bandwidth. Further features related to the transmit parameters provided in this disclosure are applicable in various embodiments.

As provided by step 1202, the UE 1 obtains information from the base station 110 as system information, particularly information related to RACH configuration which may e.g. identify a threshold value M related to minimum received signal strength value. Further features related to received system information provided in this disclosure are applicable in various embodiments.

As provided in step 1203, the received threshold information may be used in combination with the transmit parameter(s) to define a threshold N, for determining when the UE is allowed or triggered to apply transmission repetition of an access preamble to obtain initial access. Further features related to the determination of the threshold level N provided in this disclosure are applicable in various embodiments.

If received signal power of a synchronization signal from the base station 110 exceeds the threshold N, only one preamble is transmitted in a single first access channel resource in to step 1204, according to legacy NR procedures.

If the received signal power does not exceed the determined threshold level N, the UE 1 is triggered to attempt transmission repetition of the access preamble to enhance coverage.

As provided in step 1205, if the base station 110 supports a new, second, access channel resource for the same access occasion index, as identified by information obtained in system information, the UE will transmit preamble with repetitions in legacy and new resource as provided in step 1206, i.e. in the first access channel resource and in at least the second access channel resource. Further features related to the information identifying the second access channel resource, such as parameters related to time and/or frequency shift, provided in this disclosure are applicable in various embodiments.

If the information obtained in system information from the base station 110 does not identify a new, second, access channel resource for the same access occasion index, the UE is triggered to proceed to transmit the access preamble by repetition using legacy resources, responsive to at least two synchronization signals being detected above a threshold level, e.g. a threshold M, as indicated in step 1207. This entails detecting sufficiently strong synchronization signals identifying two or more base station transmit resources, such as SSB resources, representing different spatial filters or Tx beams of the base station 110, and to determine the first and second access channel resources associated with the respective first and second transmit resources. Further features related to the identification and use of the threshold M provided in this disclosure are applicable in various embodiments.

As provided in step 1208, if such first and second access channel resources representing different access occasions, such as e.g. identified by different RO indices, transmission repetition of the access preamble is carried out in said first and second access channel resources. Further features related to the identification and use of the first and second access channel resources associated with different transmit resources of the base station, such as different beams, provided in this disclosure are applicable in various embodiments.

As provided in step 1209, if the criteria provided in step 1207 is not met, the UE is triggered to continue making measurements on signal strength and wait for a next access occasion, such as in a subsequent frame.

Various embodiments have been outlined above, and except where they are clearly contradictory, they may be combined in any form. Various of those embodiments are outlined in the following clauses (C):

C1. Method for network access carried out in a User Equipment, UE, the method comprising:
acquiring at least one of a plurality of synchronization signals transmitted from a base station, each synchronization signal identifying a synchronization resource usable for identifying an associated access channel resource of a sequence of access channel resources;
synchronizing to the base station based on the at least one synchronization signal;
obtaining, from the base station, information identifying a first access channel resource and a second access channel resource;
transmitting an access preamble in the first access channel resource, and
transmitting, based on meeting a repetition criteria, said access preamble in the second access channel resource for enhanced coverage operation.

C2. The method of C1, wherein said repetition criteria is received signal power of the at least one synchronization signal meeting a threshold level criteria.

C3. The method of C2, comprising determining a threshold level for the threshold level criteria based on at least one transmit parameter of the UE.

C4. The method of C3, wherein said threshold level comprises a system threshold component obtained based on the information received from said base station, which system threshold component is adjusted based on said transmit parameter.

C5. The method of C4, wherein said system threshold component indicates a minimum received signal strength value.

C6. The method of any of C3-05, wherein said threshold level is dependent on a transmit parameter based on antenna gain of the UE.

C7. The method of any of C3-C6, wherein said threshold level is dependent on a transmit parameter based on transmit power of the UE.

C8. The method of C1, wherein said repetition criteria comprises detecting, in the UE, failed reception in the base station of a preceding transmission of the access preamble in the first access channel resource.

C9. The method of any preceding clause, wherein said information indicates allocation of the second access channel resource as configured by the base station.

C10. The method of any preceding clause, wherein said information indicates allocation of the second access channel resource relative to the first access channel resource.

C11. The method of any preceding clause, wherein said information indicates a frequency shift parameter, which identifies the frequency location of the second access channel resource relative to the first access channel resource.

C12. The method of any preceding clause, wherein said information indicates a time shift parameter, which identifies a timing of the second access channel resource relative to the first access channel resource.

C13. The method of any preceding clause, wherein the first access channel resource is indicative of one access occasion of a first sequence of access occasions and the second access channel resource is indicative of the corresponding one access occasion of a second sequence of access occasions corresponding to the first sequence.

C14. The method of C13, wherein the first sequence of access occasions is allocated in a first subchannel and the second sequence of access occasions is allocated in a second subchannel.

C15. The method of C14, wherein each access occasion on the first subchannel has a mutual time shift to at least one corresponding access occasion on the second subchannel.

C16. The method of C14, wherein the second sequence of access occasions is allocated as a circular permutation of the first sequence of access occasions.

C17. The method of C14 or C15, wherein said information identifies n≥1 access occasions in succession on the second subchannel, corresponding to one access occasion identified by the first resource on the first subchannel.

C18. The method of any of C1-C13, wherein the first access channel resource is one of a first sequence of access occasions allocated in a first subchannel and the second access channel resource is a corresponding one of a second sequence of access occasions allocated in the first subchannel in time succession to the first sequence of access occasions.

C19. The method of any preceding clause, wherein the first access channel resource and the second access channel resource have a common access occasion index.

C20. The method of any preceding clause, wherein said information is received as system information from the base station.

C21. The method of any of C1-C8, wherein the first access channel resource is indicative of a first access occasion associated with a first associated synchronization resource, and the second access channel resource is indicative of a second access occasion associated with a second associated synchronization resource.

C22. The method of C21, wherein each at least one synchronization signal comprises a synchronization signal block, SSB, and the identified synchronization resource is an SSB resource.

C23. The method of C22, wherein said information is obtained by detection of both said first SSB and said second SSB with received signal power meeting a threshold level criteria.

C24. The method of any of C21-C23, wherein the first access channel resource and the second access channel resource have different access occasion indices.

C25. The method of any of C21-C24, wherein transmit power in the first access channel resource and transmit power in the second access channel resource are respectively configured to obtain a common link budget.

C26. The method of any of C1-C8, wherein, responsive to said information being obtained by receiving system information identifying a first subchannel for the first access channel resource and a second subchannel for repetition, the preamble is transmitted in the first subchannel and repeated in the second subchannel; and otherwise responsive to said information being obtained by receiving a first synchronization signal block, SSB, identifying a first SSB resource and a second SSB identifying a second SSB, the preamble is transmitted in a the first access channel resource associated with the first SSB resource, and repeated in the second access channel resource associated with the second SSB resource.

C27. Method for coverage enhancement of a User Equipment, UE, carried out in a base station of a wireless network, the method comprising:

transmitting at least one synchronization signal;

transmitting information identifying a threshold component for use in the UE as a part of a repetition criteria test in the UE to determine access preamble repetition in uplink;

receiving an access preamble from the UE in a first access channel resource associated with one of the at least one synchronization signal;

receiving a repeated transmission of the access preamble from the UE in a second access channel resource.

C28. The method of C27, wherein said repetition criteria comprises any of the features according to C2-C8.

C29. The method of C27 or C28, comprising configuring allocation of the second access channel resource, wherein said information indicates the configured allocation.

C30. The method of C29, wherein said information indicates allocation of the second access channel resource relative to the first access channel resource.

The invention claimed is:

1. A method for network access carried out in a user equipment (UE), the method comprising:
   acquiring at least one of a plurality of synchronization signals transmitted from a base station, each synchronization signal identifying a synchronization resource usable for identifying an associated access channel resource of a sequence of access channel resources;
   synchronizing to the base station based on the at least one synchronization signal;
   obtaining, from the base station, information identifying a first access channel resource and a second access channel resource;
   transmitting an access preamble in the first access channel resource, and
   transmitting, based on meeting a repetition criteria, said access preamble in the second access channel resource for enhanced coverage operation.

2. The method of claim 1, wherein said repetition criteria is received signal power of the at least one synchronization signal meeting a threshold level criteria.

3. The method of claim 2, comprising:
   determining a threshold level for the threshold level criteria based on at least one transmit parameter of the UE.

4. The method of claim 3, wherein said threshold level comprises a system threshold component obtained based on the information received from said base station, which system threshold component is adjusted based on said transmit parameter.

5. The method of claim 4, wherein said system threshold component indicates a minimum received signal strength value.

6. The method of claim 3, wherein said threshold level is dependent on a transmit parameter based on at least one of antenna gain of the UE or transmit power of the UE.

7. The method of claim 1, wherein said repetition criteria comprises detecting, in the UE, failed reception in the base station of a preceding transmission of the access preamble in the first access channel resource.

8. The method of claim 1, wherein said information indicates allocation of the second access channel resource as configured by the base station.

9. The method of claim 1, wherein said information indicates allocation of the second access channel resource relative to the first access channel resource.

10. The method of claim 1, wherein said information indicates a frequency shift parameter, which identifies the frequency location of the second access channel resource relative to the first access channel resource.

11. The method of claim 1, wherein said information indicates a time shift parameter, which identifies a timing of the second access channel resource relative to the first access channel resource.

12. The method of claim 1, wherein the first access channel resource is indicative of one access occasion of a first sequence of access occasions and the second access channel resource is indicative of the corresponding one access occasion of a second sequence of access occasions corresponding to the first sequence.

13. The method of claim 12, wherein the first sequence of access occasions is allocated in a first subchannel and the second sequence of access occasions is allocated in a second subchannel.

14. The method of claim 13, wherein each access occasion on the first subchannel has a mutual time shift to at least one corresponding access occasion on the second subchannel.

15. The method of claim 13, wherein the second sequence of access occasions is allocated as a circular permutation of the first sequence of access occasions.

16. The method of claim 13, wherein said information identifies n≥1 access occasions in succession on the second subchannel, corresponding to one access occasion identified by the first resource on the first subchannel.

17. The method of claim 1, wherein the first access channel resource is one of a first sequence of access occasions allocated in a first subchannel and the second access channel resource is a corresponding one of a second sequence of access occasions allocated in the first subchannel in time succession to the first sequence of access occasions.

18. The method of claim 1, wherein the first access channel resource and the second access channel resource have a common access occasion index.

19. The method of claim 1, wherein the first access channel resource is indicative of a first access occasion associated with a first associated synchronization resource, and the second access channel resource is indicative of a second access occasion associated with a second associated synchronization resource.

20. The method of claim 19, wherein each at least one synchronization signal comprises a synchronization signal block (SSB) and the identified synchronization resource is an SSB resource.

21. The method of claim 20, wherein said information is obtained by detection of the SSB with received signal power meeting a threshold level criteria.

22. The method of claim 19, wherein the first access channel resource and the second access channel resource have different access occasion indices.

23. The method of claim 19, wherein transmit power in the first access channel resource and transmit power in the second access channel resource are respectively configured to obtain a common link budget.

24. The method of claim 1, wherein,
responsive to said information being obtained by receiving system information identifying a first subchannel for the first access channel resource and a second subchannel for repetition, the preamble is transmitted in the first subchannel and repeated in the second subchannel; and otherwise
responsive to said information being obtained by receiving a first synchronization signal block (SSB) identifying a first SSB resource and a second SSB identifying a second SSB, the preamble is transmitted in a the first access channel resource associated with the first SSB resource, and repeated in the second access channel resource associated with the second SSB resource.

25. A method for coverage enhancement of a user equipment (UE) carried out in a base station (BS) of a wireless network, the method comprising:
transmitting a plurality of synchronization signals that enable synchronization of the UE to the BS based on at least one of the plurality of synchronization signals, wherein each synchronization signal identifies a synchronization resource usable for identifying an associated access channel resource of a sequence of access channel resources;
transmitting information identifying a first access channel resource, a second access channel resource, and a threshold component for use in the UE as a part of a repetition criteria test in the UE to determine access preamble repetition in uplink;
receiving an access preamble from the UE in the first access channel resource associated with one of the at least one synchronization signal; and
receiving repeated transmissions of the access preamble, transmitted by the UE based on the UE determining meeting a repetition criteria, in the second access channel resource.

* * * * *